United States Patent [19]

Goldie

[11] 4,334,463
[45] Jun. 15, 1982

[54] FOOD COOKING AND LIFTING DEVICE

[76] Inventor: Elizabeth L. Goldie, 734 E. Stepney St., Inglewood, Calif. 90302

[21] Appl. No.: 211,077

[22] Filed: Nov. 28, 1980

[51] Int. Cl.³ .............................................. A47J 43/18
[52] U.S. Cl. ..................................... 99/426; 206/597; 294/74; D7/129
[58] Field of Search ................. 99/426, 427, 450, 409, 99/415, 418; 294/31.2, 32, 74, 150, 151, 152; D7/129, 130; 100/2; 206/597; 426/523

[56] References Cited

U.S. PATENT DOCUMENTS

| Re. 22,753 | 5/1946 | Trevisan | 294/150 |
| 2,846,942 | 8/1958 | Bowman | 99/427 |
| 2,973,218 | 2/1961 | Schaum | 294/151 |
| 3,237,760 | 3/1966 | De Remer | 206/597 |
| 3,292,831 | 12/1966 | Moen | 294/157 |

FOREIGN PATENT DOCUMENTS

| 8563 | 11/1979 | Fed. Rep. of Germany | 294/74 |
| 1460085 | 10/1966 | France | 294/74 |
| 264790 | 4/1927 | United Kingdom | 99/418 |

*Primary Examiner*—Billy J. Wilhite
*Attorney, Agent, or Firm*—Henry M. Bissell

[57] ABSTRACT

The improved food cooking device of the present invention is especially adapted for roasting bulky meat items such as turkeys, hams, chickens, standing ribs and other large heavy cuts of beef, legs of lamb, etc. and for lifting the the same after roasting from the roasting pan or roasting area in accordance with the present method. The device includes a perforated generally flat horizontal rack of aluminum or the like having vertically depending legs adapted to support the rack above the bottom of a roasting pan or the like so as to prevent uneven roasting of the food on the rack and so as to remove the food from direct contact with its drippings. The device also includes means for securing the food directly to the rack and for facilitating lifting of both the roasted food and the rack together from the roasting pan, in accordance with the method. Such securing means include strips of Nylon or the like from which finger loops are formable for lifting of the string/food/rack assembly as a unit after cooking. The rack may include upraised loops at the periphery thereof to which the strings are readily attachable. Preformed loops of Nylon or the like may be slidably disposed on and/or tied to the strings for interconnecting the strings with the rack legs (in which event the rack loops can be obviated) and for lifting the rack with the food thereon. Alternatively, hooks may be attached to the strings and releasably connected to the rack legs and a strap may be hooked to the strings to facilitate lifting the string-/food/rack assembly.

7 Claims, 4 Drawing Figures

FOOD COOKING AND LIFTING DEVICE

BACKGROUND OF THE INVENTION

1. Field of the Invention

The present invention generally relates to improved cooking means and methods and, more particularly, to an improved device and method to facilitate roasting and lifting of heavy bulky roasts such as meats, hams, turkeys and similar items from roasting pans.

2. Description of the Prior Art

Conventional roasting of meat and similar foods is accomplished in a roasting pan, with or without a rack disposed therein. The meat is placed on the bottom of the roasting pan or on the rack itself and is roasted in place. When the meat is fully roasted and is to be removed from the roasting pan, it must be deeply pierced by one or more large forks and/or pried up by gripping with large spoons or other implements in an attempt to get it safely out of the pan and onto a serving tray, dish, plate, carving block or the like. This sometimes requires the cooperation of two or more people. The piercing tends to mar the appearance of the meat and causes it to lose juices. Moreover, the fork tines may be bent by the procedure and there is a very real risk of dropping the meat, dirtying it, breaking or damaging it and creating an unappetizing time-consuming mess as well as burning the cooks. Even if the meat is on a rack, it is still very difficult to handle. The rack itself ordinarily cannot be used in any way to lift it and the rack may actually interfere with attempts to lever the meat up and out of the roasting pan.

Accordingly, there is a need for improved kitchen equipment which will facilitate supporting food for roasting and lifting the food when roasted from the roasting pan and placing it safely on a carving block, tray, plate, etc. without spillage or dropping.

SUMMARY OF THE INVENTION

The improved food cooking and lifting device and method of the present invention satisfies all the foregoing needs. The device and method are substantially as set forth in the Abstract above. The device includes a perforated, generally flat rack with depending legs to support above the bottom of a roasting pan. The device further includes means for releasably securing the food to be roasted to the rack and for lifting it with the rack from the roasting pan. Such means include tie strings which pass through upraised loops on the rack or wrap around the legs of the rack and over and around the roast, and form lifting means for use after the roasting is completed. The string can be tied at the top of the roasted item into one or more lifting loops, or preformed loops of Nylon or the like can be slidably disposed on the strings to form the lifting loops and also provide means for connecting the strings to each other and to the rack. Hooks can be used in place or in addition to the loops, and a lifting strap can be attached by one or more hooks to the string. Various other features of the invention are set forth in the following detailed description and accompanying drawings.

DESCRIPTION OF THE PREFERRED EMBODIMENTS

Figure 1:
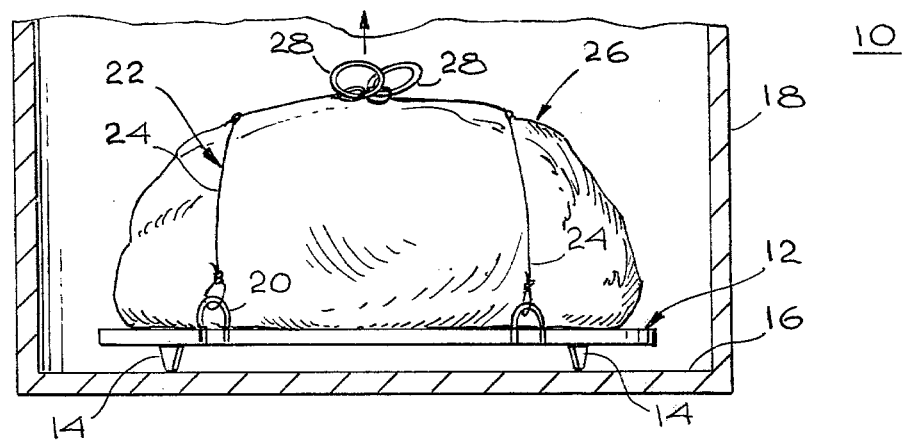
FIG. 1 is a schematic side elevation, partly broken away, of a first preferred embodiment of the improved cooking device of the present invention, shown with a roast tied in place thereon, and disposed in a roasting pan.
Figure 2:
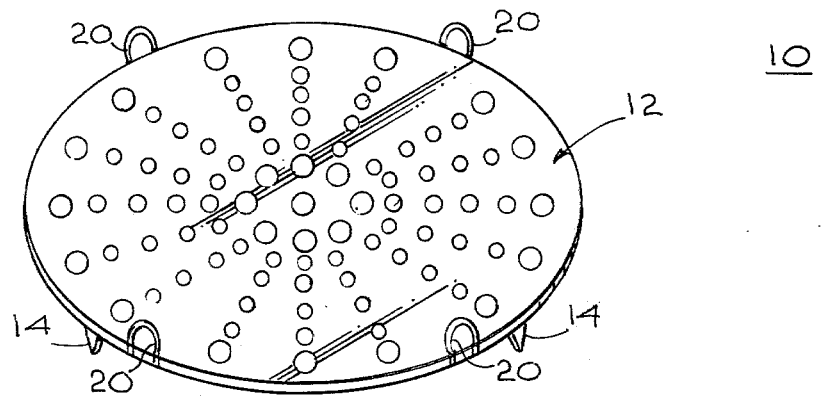
FIG. 2 is a schematic, generally plan view of the rack portion of the device of FIG. 1.

FIGS. 1 and 2

A first preferred embodiment of the improved cooking device of the present invention is schematically depicted in FIGS. 1 and 2. Thus, device 10 is shown which comprises a generally flat, horizontal, oval perforated rack 12 of aluminum or the like and having a plurality of spaced depending legs 14 secured thereto and supporting a rack or tray 12 above the bottom 16 of a roasting pan 18. The rack 12 includes four upstanding hollow loops 20 spaced along the periphery thereof. Device 10 also includes securing means 22 in the form of strings 24 of Nylon or the like releasably tied to loops 20 and disposed over and around a meat roast or fowl 26 or the like on rack 12 to releasably tie the meat 26 securely to rack 12. String 26 is also tied onto a pair of lifting loops 28 at the top of roast 26.

Thus, in accordance with the present method, roast 26 is tied in place on rack 12 and roasted in pan 18, after which it is lifted from pan 18 easily and conveniently with rack 12 attached thereto and placed on a cutting board, serving tray etc. The danger of dropping roast 26 is eliminated, as is the danger of spillage, burns, etc. Strings 24 can then be untied or cut away to free roast 26 and rack 12 can be removed for reuse. Thus, device 10 and the present method are simple, inexpensive and efficient in use.

FIG. 3

Figure 3:
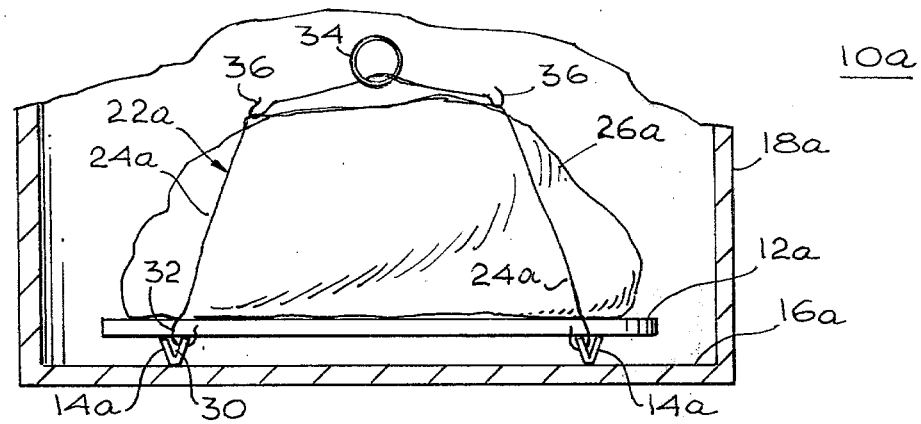
FIG. 3 is a schematic side elevation, partly broken away, of a second preferred embodiment of the improved cooking device of the present invention, again shown with a roast tied in place on a rack in a roasting pan.

A second preferred embodiment of the invention is schematically depicted in FIG. 3. Components thereof similar to those of FIGS. 1 and 2 bear the same numerals but are succeeded by the letter "a". Thus, device 10a is shown which comprises a flat, horizontal perforated rack 12a provided with a plurality of vertically depending support legs 14a secured thereto. Legs 14a are V-shaped with an open central portion 30. Legs 14a are shown supporting rack 12a above the bottom 16a of a roasting pan 18a.

Rack 12a has no upstanding loops such as loops 20 of rack 12. Instead, securing means 22a in the form of strings 24a include terminal hooks 32 of Nylon or other plastic, metal or the like which releasably engage legs 14a through the open centers 30 thereof, as shown in FIG. 3. Strings 24a extend over and around roast 26a to releasably bind it to rack 14a. In place of loops 28 formed in the string, a handle 34 of string, plastic or the like with hooks 36 (similar to hooks 32) disposed on opposite ends thereof is releasably secured to strings 24a at the top of roast of 26a to facilitate lifting of roast 26a, while still bound to rack 14, from pan 18a. Thus, device 10a substantially provides the advantages of device 10.

FIG. 4

Figure 4:
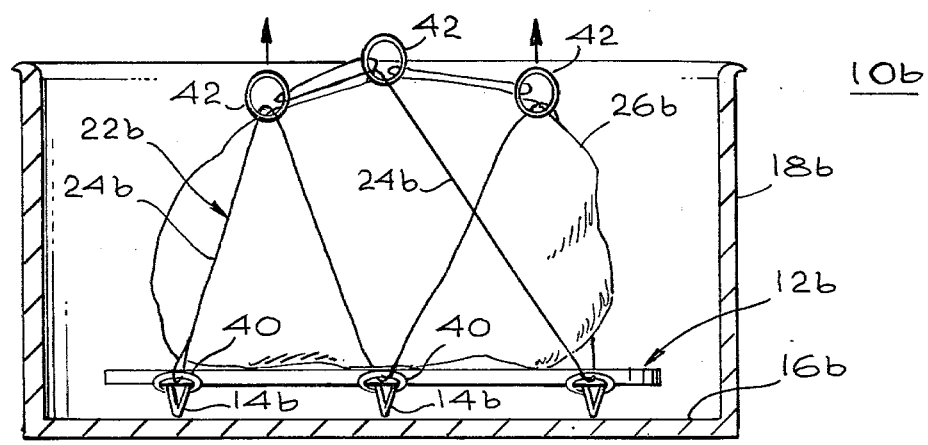
FIG. 4 is a schematic side elevation, partly broken away, of a third preferred embodiment of the improved cooking device of the invention, shown with a roast tied to a rack in a roasting pan.

A third preferred embodiment of the improved roasting aid of the present invention is schematically depicted in FIG. 4. Components thereof similar to those of FIGS. 1 and 2 bear the same numerals but are succeeded by the letter "b". Thus, device 10b is shown which includes a flat, horizontal perforated rack 12b supported by attached depending legs 14b above the bottom 16b of roasting pan 18b. Device 10b also comprises securing means 22b including strings 24b secured around legs 14b by separate closed loops 40 of string or self-supporting plastic or the like, slidably disposed over string 24b. Thus, loops 40 anchor strings 24b in place to rack 12b.

Strings 24b are also trained over and around roast 26b to bind it to rack 12b. Strings 24b are interconnected at the top of roast 26b, utilizing additional loops 42 similar to loops 40 and also slidably disposed on strings 24b. Loops 42 can be used to lift roast 26b, when cooked, from pan 18b, with rack 12b still attached to roast 26b, and safely place it in a convenient position on a tray, plate or a kitchen counter or the like. Strings 24b are then untied or cut off of roast 26b and roast 26b can be carved and served directly from rack 12b or transferred in pieces to a serving platter, etc. Loops 40 and 42 can be saved for reuse. Thus, device 10b has substantially similar advantages to those of devices 10 and 10a.

Although there have been described above specific arrangements of an improved food cooking and lifting device and method in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. An improved food cooking and handling device, said device comprising, in combination:
   (a) a perforated food rack having a plurality of depending legs secured thereto for support of said rack in a cooking container above the bottom thereof; and
   (b) securing means including
      (i) a plurality of strings adapted to releasably tie a bulky item of food in place on said rack for cooking in said cooking container and to facilitate lifting of said food from said container while tied to said rack and transferring it to another location, the lower ends of said strings being connected to said rack, and
      (ii) means securing the upper ends of said strings together to support and hold said bulky item of food in place on said rack.

2. The device of claim 1 wherein said device is adapted for roasting meat and the like in a roasting pan and wherein said strings include finger loops formed therein for lifting said meat and rack by said strings from a roasting pan or the like.

3. The device of claim 1 wherein said rack includes a plurality of spaced upraised loops disposed along the outer periphery of said rack to which the lower ends of said strings are connected.

4. The device of claim 1 wherein said securing means include hooks attached to the lower ends of said strings releasably connecting said strings to said rack.

5. The device of claim 4 wherein said securing means includes a lifting strap having at least one hook which is secured to said strings for lifting said food item and rack together by said strings after cooking of said food.

6. The device of claim 1 wherein said securing means include separate closed loops slidable on said strings for interconnection of said strings with said rack legs and for lifting said food item and rack together by said strings after cooking of said food.

7. The device of claim 1 wherein said rack is flat and formed of aluminum, and wherein said strings are of Nylon.

* * * * *